United States Patent
Casas

(10) Patent No.: US 9,270,149 B1
(45) Date of Patent: Feb. 23, 2016

(54) KINETIC ENERGY TO ELECTRIC POWER CONVERTER

(71) Applicant: Ramiro Casas, Tequesta, FL (US)

(72) Inventor: Ramiro Casas, Tequesta, FL (US)

( * ) Notice: Subject to any disclaimer, the term of this patent is extended or adjusted under 35 U.S.C. 154(b) by 66 days.

(21) Appl. No.: 14/307,461

(22) Filed: Jun. 17, 2014

Related U.S. Application Data

(63) Continuation-in-part of application No. 13/252,775, filed on Oct. 4, 2011, now Pat. No. 8,754,558.

(60) Provisional application No. 61/390,369, filed on Oct. 6, 2010.

(51) Int. Cl.
| | |
|---|---|
| *F02B 63/04* | (2006.01) |
| *F03G 7/08* | (2006.01) |
| *H02K 7/18* | (2006.01) |
| *H02K 7/06* | (2006.01) |
| *H02K 35/00* | (2006.01) |

(52) U.S. Cl.
CPC ..................... *H02K 7/06* (2013.01)

(58) Field of Classification Search
USPC ............................... 290/1 R; 322/3
See application file for complete search history.

(56) References Cited

U.S. PATENT DOCUMENTS

| | | | | |
|---|---|---|---|---|
| 381,160 A | * | 4/1888 | Moon | B25B 15/06 123/195 HC |
| 3,559,027 A | * | 1/1971 | Arsem | B60G 13/14 180/65.31 |
| 4,318,018 A | * | 3/1982 | Kennedy | G01P 3/487 310/156.14 |
| 4,500,827 A | * | 2/1985 | Merritt | H02K 35/04 290/1 R |
| 4,815,575 A | * | 3/1989 | Murty | B60G 17/0157 188/266.1 |
| 5,209,650 A | | 5/1993 | Lemieux | 417/356 |
| 5,951,262 A | | 9/1999 | Hartman | 417/356 |
| 6,664,694 B2 | * | 12/2003 | Yang | H02K 7/12 310/112 |
| 6,948,328 B2 | * | 9/2005 | Kidwell | F25B 3/00 165/104.25 |
| 2005/0064064 A1 | | 3/2005 | Ickinger | 425/574 |
| 2010/0001529 A1 | | 1/2010 | Rosefsky | 290/52 |

* cited by examiner

*Primary Examiner* — Pedro J Cuevas
(74) *Attorney, Agent, or Firm* — Allen D. Hertz

(57) ABSTRACT

A kinetic energy converter for converting linear motion into electrical energy has an outer body and an inner cylindrical body. The outer body and the inner body define a common central axis wherein the outer body is movable along the central axis with respect to the inner cylindrical body. A stator winding of a plurality of turns of at least one electrically conductive wire is disposed about an inner periphery of the inner body. A rotor having a central shaft and a plurality of magnets radially extending therefrom is rotatably disposed within the inner body and rotatable about the central axis. A helically twisted blade extends from one end of the outer body to the rotor and is interengaged with the rotor wherein axial translation of the blade rotates the rotor about the central axis.

20 Claims, 5 Drawing Sheets

KINETIC ENERGY TO ELECTRIC POWER CONVERTER

CROSS-REFERENCE TO RELATED APPLICATION

This United States Non-Provisional Utility Application is a Continuation-In-Part of U.S. Non-Provisional Utility application Ser. No. 13/252,775, filed on Oct. 4, 2011 (scheduled to issue as U.S. Pat. No. 8,754,558 on Jun. 17, 2014), which claims the benefit of U.S. Provisional Patent Application Ser. No. 61/390,369, filed on Oct. 6, 2010, both of which are incorporated herein in their entireties.

FIELD OF THE INVENTION

The present disclosure generally relates to apparatuses and methods for capturing and storing kinetic energy. More particularly, the present disclosure relates to a kinetic energy converter that translates linear motion into electrical energy.

BACKGROUND OF THE INVENTION

With a growing awareness that dependency upon carbon based fuels is a worldwide factor in ecological, political, and economic instability, increasing numbers of consumers are turning their attention to alternative fuel automobile and electric vehicle technologies with additional attention being directed to reducing such dependencies with respect to other energy consuming activities in everyday life. The automotive markets are showing a shift away from fossil fuel technologies and in response to this market demand. As the consumer demand increases in a free market economy, the product supply will grow and evolve to meet the demand for green technologies.

While some green technologies completely eliminate the use of fossil fuels for propulsive power, such as totally electric cars, other technologies attempt to improve the energy efficiency of fossil fueled vehicles through the use of hybrid and other technologies. The burning of fossil fuels in vehicles such as in internal combustion engines has long been recognized as being relatively inefficient with a significant portion of the energy released during combustion being wasted. One method of improving energy efficiency is utilizing fossil fuel to generate electricity for powering a vehicles drive trail. In this manner, the energy of the fossil fuel can be generated at an optimum level, translated to electrical energy for storage in batteries, wherein the cyclical demands of driving are drawn from the batteries rather than cycling an internal combustion engine between efficient and inefficient modes of operation.

In other areas of everyday life, one witnesses natural motions that if harnessed can contribute to the energy demands of society. Air mass movements such as the wind can be transformed to mechanical motions to drive machines, the rising and falling of the tides or cyclical wave movement are other forms of motion with the potential to be harnessed to capture the kinetic energy expended during the movements of those phenomena. Even the cyclical movement generated by a person while breathing offers the potential for capture and transformation for use in powering implanted life sustaining medical devices.

Therefore, a technology is needed whereby everyday motion, such as linear motion or rotational motion, can be captured, harnessed, and transformed into a storable form of energy such as electrical power for later use.

SUMMARY OF THE INVENTION

The present disclosure is generally directed to a kinetic energy converter for converting linear motion into electrical energy. The kinetic energy converter has an outer body and an inner cylindrical body that define a common central axis wherein the outer body is movable along the central axis with respect to the inner cylindrical body. A stator winding of a plurality of turns of at least one electrically conductive wire is disposed about an inner periphery of the inner body. A rotor having a central shaft and a plurality of magnets radially extending therefrom is rotatably disposed within the inner body and rotatable about the central axis. A helically twisted blade extends from one end of the outer body to the rotor and is interengaged with the rotor wherein axial translation of the blade rotates the rotor about the central axis.

In some embodiments, the kinetic energy converter may include Compression springs interposed between the inner body and outer body to bias the inner and outer bodies away one from the other.

In another aspect, the kinetic energy converter can include a rotor shaft comprised of inner and outer cylinders wherein the cylinders define a cannular void between the cylinders, which can be filled with a thermally absorptive liquid.

In still another aspect, the rotor shaft includes radially extending pins on which the magnets are movably mounted to be radially translatable. The magnets can also be biased toward the rotor shaft with one or more tension springs having one end affixed to the magnet and an opposite end affixed to the rotor shaft.

In yet another aspect, the helically twisted blade axially extends into a central void in the rotor shaft wherein one or more clutches interengage the helically twisted blade with the shaft such that axial translation of the helically twisted blade in a first direction engages the clutches with the rotor shaft and axial translation of the helically twisted blade in an opposite direction disengages the clutches from the rotor shaft.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
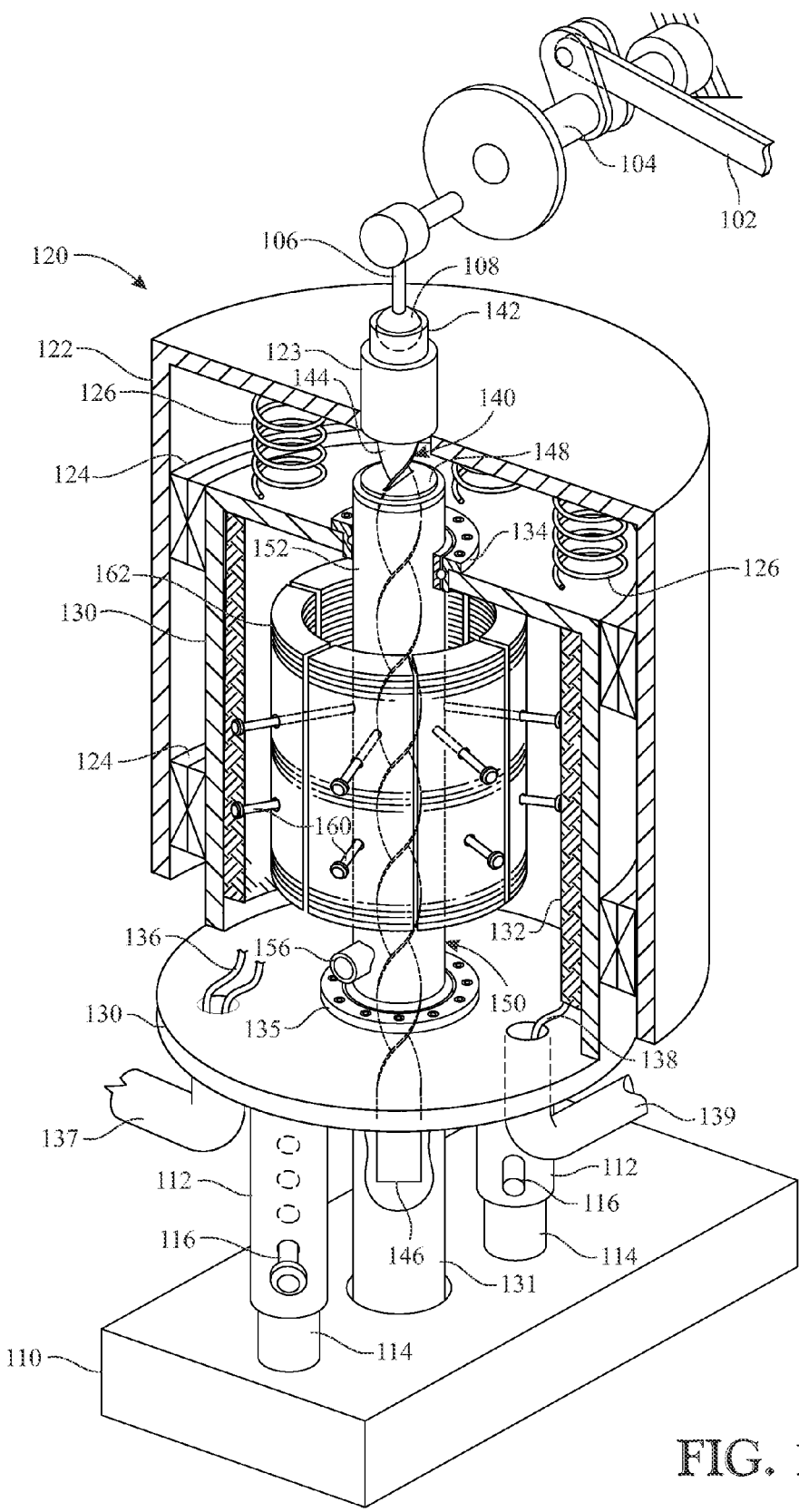
FIG. 1 presents an isometric partial cut away view of an exemplary kinetic energy converter in accordance with one embodiment of the present invention.
Figure 2:
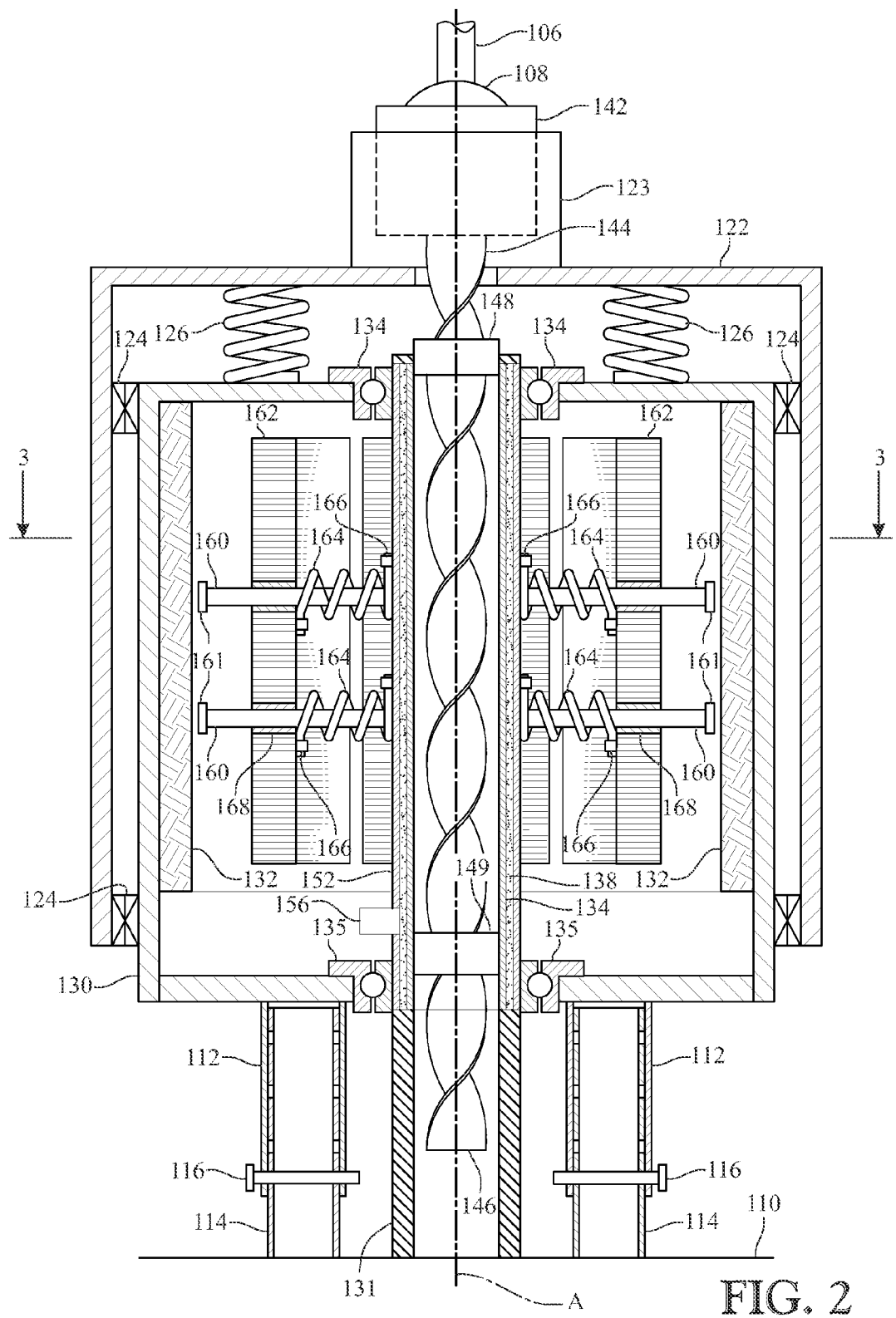
FIG. 2 presents an elevation cross-section view of the kinetic energy converter of FIG. 1.
Figure 3:
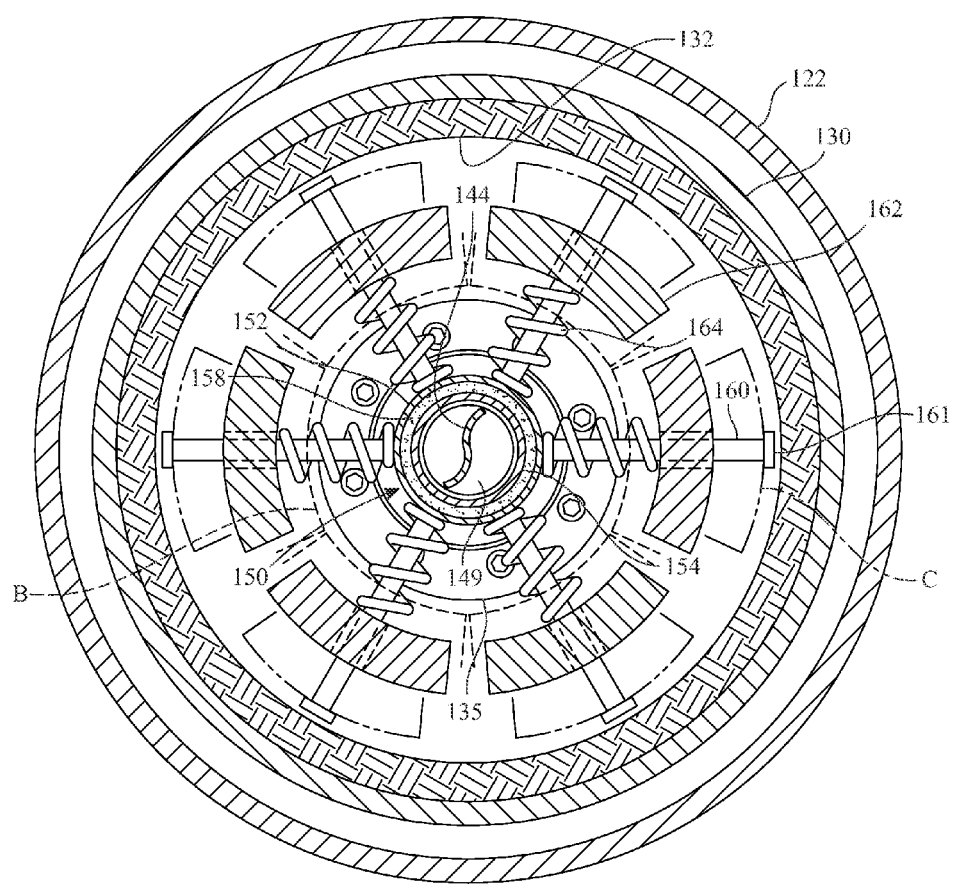
FIG. 3 presents a cross-sectional plan view of the kinetic energy converter shown in FIG. 2, wherein the section is taken along section line 3-3 of FIG. 2.

Turning to the drawings, FIGS. 1-3 show a kinetic energy converter 120 for converting linear motion kinetic energy into electrical energy, which is one of the preferred embodiments of the present invention, and illustrate the various components thereof. The kinetic energy converter 120 includes an outer body 122 and an inner body 130, wherein the inner body 130 is at least partially encased within the outer body 122. Both the outer body 122 and the inner body 130 define a common central axis "A" (FIG. 2). Outer support tubes 112 are integrated with the inner body 130 and extending from a bottom portion of the inner body 130. As illustrated, a plurality of inner support tubes 114 extending upwardly from a base 110, wherein each inner support tube 114 receives thereover a respective outer support tube 112. The inner support tubes 114 include a plurality of holes therethrough enabling insertion of pins 116 therein to adjust a height of the kinetic energy converter 120 with respect to the base 110 in a manner well known in the art.

The kinetic energy converter 120 functions as an electric generator or an alternator for translating a linear motion into the rotating motion of a rotor to repeatedly pass magnets proximate to a stator thereby creating electrical energy. The inner body 130 is cylindrical in shape and has a stator winding 132 disposed about an inner periphery thereof. The stator winding 132 comprises at least one electrically conductive wire arranged in multiple turns about the inner periphery of the inner body 130 in a manner well known in the art. The stator winding 132 is electrically connected to power out conductors 136 routed in a conduit 137. The stator winding 132 is also electrically connected to an exciter conductor 138 in a conduit 139 for the generation of alternating current, the functionality thereof is well known by those skilled in the art and not the subject of further discussion herein.

The inner body 130 includes a rotor assembly 150, which is rotatingly journaled at both ends thereto by an upper bearing 134 and a lower bearing 135. The rotor assembly 150 also rotates about the central axis "A". The rotor assembly 150 includes a shaft, which, as illustrated, comprises an outer cylinder 152 and an inner cylinder 154 in a fixed relationship of one with the other to rotate as a single shaft assembly. The cylinders 152 and 154 define a cannular void therebetween, which is filled with a thermally absorptive liquid 158. The outer cylinder 152 includes a fill port 156 for introducing the thermally absorptive liquid 158 between the outer cylinder 152 and the inner cylinder 154.

The outer cylinder 152 has a plurality of guide pins 160 extending radially outward therefrom in a spoke-like fashion at equal radial intervals. For example, if there is six guide pins 160 extending about the periphery of the outer tube 152, each pair of adjacent pins 160 forms a sixty-degree angle. One set of pins 160 is positioned proximate to a top end of the rotor 150 and a second set of pins 160 is positioned proximate to a bottom end of the rotor 150. Each upper pin 160 has a lower pin 160 in vertical registration therewith. A magnet 162 is mounted on each pair of vertically registered pins 160. A bushing 168 can be mounted between the magnet 162 and the shaft of pins 160. The magnet 162 is slidable between a retracted position "B" (FIG. 3) and an extended position "C" (FIG. 3) along the pins 160. The extended position "C" is defined by a head 161 of each pin 160 to limit a radial travel of each respective magnet 162. Each magnet 162 has associated therewith at least one tension spring 164 interposed between the respective magnet 162 and the outer cylinder 152. As illustrated, a tension spring 164 is sleeved over each shaft of pin 160 and in this manner pin 160 also maintains springs 164 in a desired linear alignment. One end of each spring 164 is affixed to magnet 164 and one end affixed to outer cylinder 152 with fasteners 166 so that at rest, springs 164 bias magnets 162 close to axis "A". It is understood that any biasing member suitable for the subject application can provide the function of the tension spring 164.

The outer body 122 at least partially encloses the inner body 130, and as shown, the outer body 122 is also cylindrical in shape with a plurality of housing guides 124 disposed between an inner periphery of the outer body 122 and the outer periphery of the inner body 130. The housing guides 124 facilitate an axial movement of the outer body 122 with respect to the inner body 130. A plurality of compression springs 126 are disposed between an upper end of the inner body 130 and an upper end of the outer body 122 and function to bias the upper end of the outer body 122 away from the upper end of the inner body 130.

The outer body 122 also includes at a center of its upper end, a receptacle for closely receiving a socket 142 in a manner to securely maintain the socket 142 in the receptacle 123. A twisted blade assembly 140, comprising a helically twisted blade 144, extends downwardly from the top center of the outer body 122 into the central cavity of the inner tube 154 of the rotor assembly 150. The inner tube 154 also closely receives an upper clutch 148 and a lower clutch 149 in its central cavity. The clutches 148, 149 also have a central aperture conforming to a cross-section of the helically twisted blade 144. The helically twisted blade 144 passes through the clutches 148, 149. The clutches 148, 149 are unidirectional drivers, wherein during a rotation of the clutches 148, 149 in a first direction, the clutches 148, 149 will rotationally engage the rotor assembly 150 and during a rotation of the clutches 148, 149 in an opposite direction, the clutches 148, 149 will be disengaged from the rotor assembly 150 and 'free wheel' with respect to the rotor assembly 150. Such clutch configurations are known in the art and thus require no further discussion.

The length of the helically twisted blade 144 is such that a distal end 146 extends below the bottom of the inner body 130. A blade sleeve 131 is located at a bottom center of the inner body 130, wherein a distal end 146 of the helically twisted blade 144 extends through the blade sleeve 131 in a manner wherein the distal end 146 of the helically twisted blade 144 is free to axially translate during operation.

A ball 108 is carried at a distal end of the vertical shaft 106. A socket 142 located at the top of the outer body 122 movably receives the ball 108. The vertical shaft 106, in turn, is affixed to a crankshaft 104. The crankshaft 104 is rotated by the linear translation of a connecting rod 102. Those practiced in the art will recognize that other motion direction translation mechanisms or configurations can be used to translate a horizontal motion of the connecting rod 102 into a vertical motion of the vertical shaft 106 and the mechanism as shown is merely illustrative and not intended to be limiting. Further, the kinetic energy converter 120 can be oriented in a manner that the linear motion of connecting rod 102 acts along a central axis "A".

In operation, a member of a larger apparatus causes connecting rod 102 to linearly translate or causes the crankshaft 104 to rotate. The rotation of crankshaft 104 in turn causes the vertical shaft 106 and the ball 108 to cyclically translate in an up and down motion. During the upward translation of the vertical shaft 106 the upper end of the outer body 122 translates along the central axis "A" and since the lower body 130 is fixed to the base 110, the lower body 130 remains stationary with respect to the upper body 122. In concert with the upward translation of the upper body 122, the helically twisted blade 144 is drawn upwardly through the clutches 148, 149. The conforming slots in the clutches 148, 149 follow the helical twist of helically twisted blade 144 in a manner that the clutches 148, 149 rotate in their "free-wheeling" state. The upward movement of the outer body 122 is aided by the expansion of the compression springs 126.

As the vertical rod 106 passes a top dead center orientation of the crankshaft 104, the rod 106 begins a downward stroke. The outer body 122 is forced downward compressing the springs 126 and is smoothly guided along the outer periphery of the inner body 130 by the housing guides 124. Concurrent with the downward movement of the outer body 122, the helically twisted blade is also translated downwardly along the concentric axis "A". The conforming slots in the clutches 148, 149 again follow the helical twist of the helically twisted blade 144 and rotate in an opposite "engagement" state. In this state, the rotation of the clutches 148, 149 is transferred to the shaft of the rotor assembly 150, illustrated herein as combined cylinders 152, 154. The magnets 162 are positioned at their closest positions, positions "B" (FIG. 3), when the rotor assembly 150 is at rest, thus in its state of least inertia. In this state, the rotor assembly 150 is at its easiest to rotate about central axis "A".

Each cycle of the up and down strokes of the helically twisted blade 144 results in a cycling of the clutches 148, 149 to cycle through their "free-wheeling" and "engagement" states. Each downward stroke of the helically twisted blade 144 imparts more and more energy to the rotation of the rotor assembly 150. As the rotational speed of the rotor assembly 150 increases, the centrifugal force acting upon the magnets 162 increases to overcome a biasing force of the tension springs 162 until the magnets 162 have traveled a full length of their respective pins 160 to their most distal positions, positions "C" (FIG. 3). As the rotor assembly 150 continues to rotate about the concentric axis "A", a magnetic field generated by the magnets 162 passes through the windings of the stator winding 132, thus inducing a direct or alternating electrical current that is directed to the conductors 136 for storage in a battery (310, 320 of FIG. 5) or for use in powering a remotely located electrical apparatus (302 of FIG. 5).

Upon the cessation of the force driving the connecting rod 102 or the crankshaft 104, the cyclical up and down translation of the outer body 122 and the helically twisted blade 144 also ceases. With the cessation of the axial translation of the helically twisted blade 144, the clutches 148, 149 enter their "free-wheeling" states. With no driving force applied thereto through the clutches 148, 149, the rotational speed of the rotor assembly 150 gradually lessens. As the rotation of the rotor assembly 150 decreases, so does the centrifugal force acting upon the magnets 162 until the biasing force of the springs 164 exceeds the centrifugal forces. The springs 164 then begin to bias the magnets 162 from their extended positions "C" to their respective retracted positions "B" until such time as the kinetic energy converter 120 is again actively engaged.

Those practiced in the art will recognize that the kinetic energy converter 120 can be scaled to fit large or small applications including but not limited to automotive and other vehicular applications, residential wind and water turbine applications, physiological and bio-dependent medical applications, recreational applications, and aviation applications.

Figure 4:
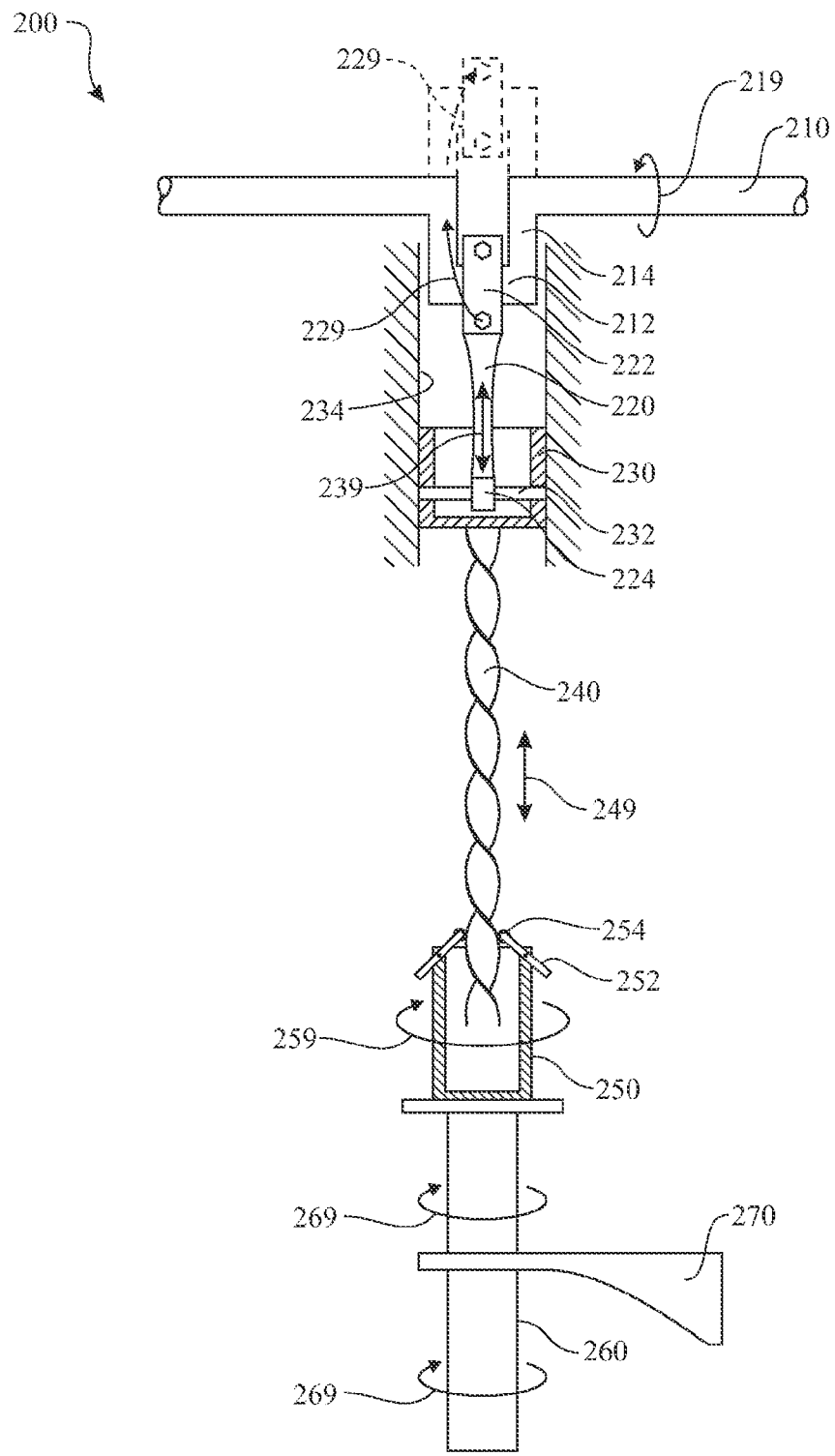
FIG. 4 presents a partially sectioned plan view of a modified application of the kinetic energy converter, wherein the kinetic energy converter translates a rotational energy obtain from a rotational motion of a first shaft to a rotational motion of a second shaft.

The kinetic energy converter 120 enables generation of electric power from a rotation of an axle. The same concept of the kinetic energy converter 120 can be applied to a helical shaft drive system 200, which can be employed to accelerate a rotation of a torque receiving shaft 260 from a rotation of a crankshaft 210, as illustrated in FIG. 4. The crankshaft 210 includes a crankpin 212 having a concentric central axis that is parallel to, while offset from, a central rotational axis of the crankshaft 210. The concentric axis of the crankpin 212 is offset from the rotational axis of the crankshaft 210 by a pair of crankpin offset member 214.

A piston 230 is slideably assembled within a cylinder wall 234. The piston 230 is operationally assembled to the crankpin 212 by a connecting rod 220. A crankshaft connecting end of the connecting rod 220 is connected to the crankpin 212 by a connecting rod crankshaft bearing 222. A piston connecting end of the connecting rod 220 is connected to the piston 230 by a connecting rod piston bearing 224. A piston pin 232 is slideably inserted through a first aperture of the piston 230, and continuing through the connecting rod piston bearing 224 of the connecting rod 220 and into a second aperture of the piston 230. One or more retention clips can be assembled to the piston pin 232 to retain the piston pin 232 in proper positioning within the piston 230. The piston 230 is subsequently inserted into the cylinder wall 234.

A piston end of a helically twisted blade 240 is affixed to an outer surface of the piston 230. An operational end of the helically twisted blade 240 is operationally assembled to a unidirectional clutch sleeve 250. A plurality of unidirectional clutch elements 252 are pivotally assembled to the unidirectional clutch sleeve 250 creating a clutch assembly. A unidirectional clutch roller 254 or similar can be assembled to a contacting end of each unidirectional clutch element 252 to reduce friction between the unidirectional clutch elements 252 and the helically twisted blade 240. The unidirectional clutch sleeves 250 are unidirectional drivers similar to the clutches 148, 149 described above. During a first linear motion of the helically twisted blade 240 in a first direction, the unidirectional clutch elements 252 will engage with the helically twisted blade 240 translating the helical shaft linear motion 249 of the helically twisted blade 240 to a unidirectional clutch sleeve 250 driving a unidirectional clutch assembly rotational motion 259 thereof. The unidirectional clutch assembly rotational motion 259 is transferred driving a torque receiving shaft rotational motion 269 of the torque receiving shaft 260. During a second linear motion of the helically twisted blade 240 in a second, opposite direction, the unidirectional clutch elements 252 will disengage from the helically twisted blade 240 and 'free wheel' with respect to the helical shaft linear motion 249 of the helically twisted blade 240. Such clutch configurations are known in the art and thus require no further discussion. It is noted that the torque receiving shaft 260 is rotationally supported by a torque receiving shaft support bracket 270. A bushing, bearing, or any other rotational supporting element can be employed between the torque receiving shaft support bracket 270 and the torque receiving shaft 260.

In operation, as the crankshaft 210 rotates about its central axis, the crankshaft rotational motion 219 of the crankshaft 210 causes the crankpin 212 to move in accordance with a crankpin rotational motion 229. The crankpin rotational motion 229 of the crankpin 212 oscillates the connecting rod crankshaft bearing 222 of the connecting rod 220, which is translated into a piston linear motion 239 of the connecting rod 220. The linear motion 239 of the connecting rod 220 drives an linear motion 239 of the piston 230. The linear motion 239 of the piston 230 is translated into a linear motion 249 of the helically twisted blade 240 along a longitudinal axis of the helically twisted blade 240. The linear motion 249 of the helically twisted blade 240 is translated into a rotational motion 269 of the torque receiving shaft 260 by the unidirectional engagement of the unidirectional clutch elements 252 with the helically twisted blade 240. The additional energy introduced by the linear motion 249 of the helically twisted blade 240 into the rotational motion 269 of the torque receiving shaft 260 increases efficiency of the system. In a condition where the torque receiving shaft rotational motion 269 is rotating at a rate greater than a rotational rate that could be obtained by engagement between the unidirectional clutch elements 252 and the helically twisted blade 240, the unidirectional clutch elements 252 would free spin, thus eliminating any potential of drag caused by interactions between the unidirectional clutch elements 252 and the helically twisted blade 240. The torque receiving shaft 260 can be attached to any mechanism to utilize the power harvested using the helically twisted blade 240.

The torque receiving shaft 260 can be a driveshaft or other similar element connected to a separate drive element. The integration of the system introduces a rotational assisting torque applied to the torque receiving shaft 260. The inclusion of the helical shaft drive system 200 decreases the a-mount of torque required to rotate the torque receiving shaft 260.

Alternatively, the torque receiving shaft 260 can be free spinning. The inertial forces provided by the helical shaft drive system 200 in conjunction with the torque receiving shaft 260 actually reduces the torque required to rotate the crankshaft 210, resulting in harnessing normally discarded energy, decreasing energy consumption, and thus improving fuel/energy efficiency.

In an exemplary model, it was found that the rotational speed of the torque receiving shaft 260 can be upwards of ten (10) times a rotational speed of the crankshaft 210. The ratio can be designed by modifying a stroke of the piston 230. The stroke of the piston 230 is governed by a length of the crankpin offset member 214 (which defines an offset between a center of the crankpin 212 and a rotational center of the crankshaft 210), The stroke of the piston 230 can be affected by a length of the connecting rod 220. The generated rate of rotation of the clutch assembly (unidirectional clutch sleeve 250 and associated components) can be affected by the rate of the twist of the helically twisted blade 240. It is also understood that the rotational speed 219 of the crankshaft 210 also impacts the system.

Figure 5:
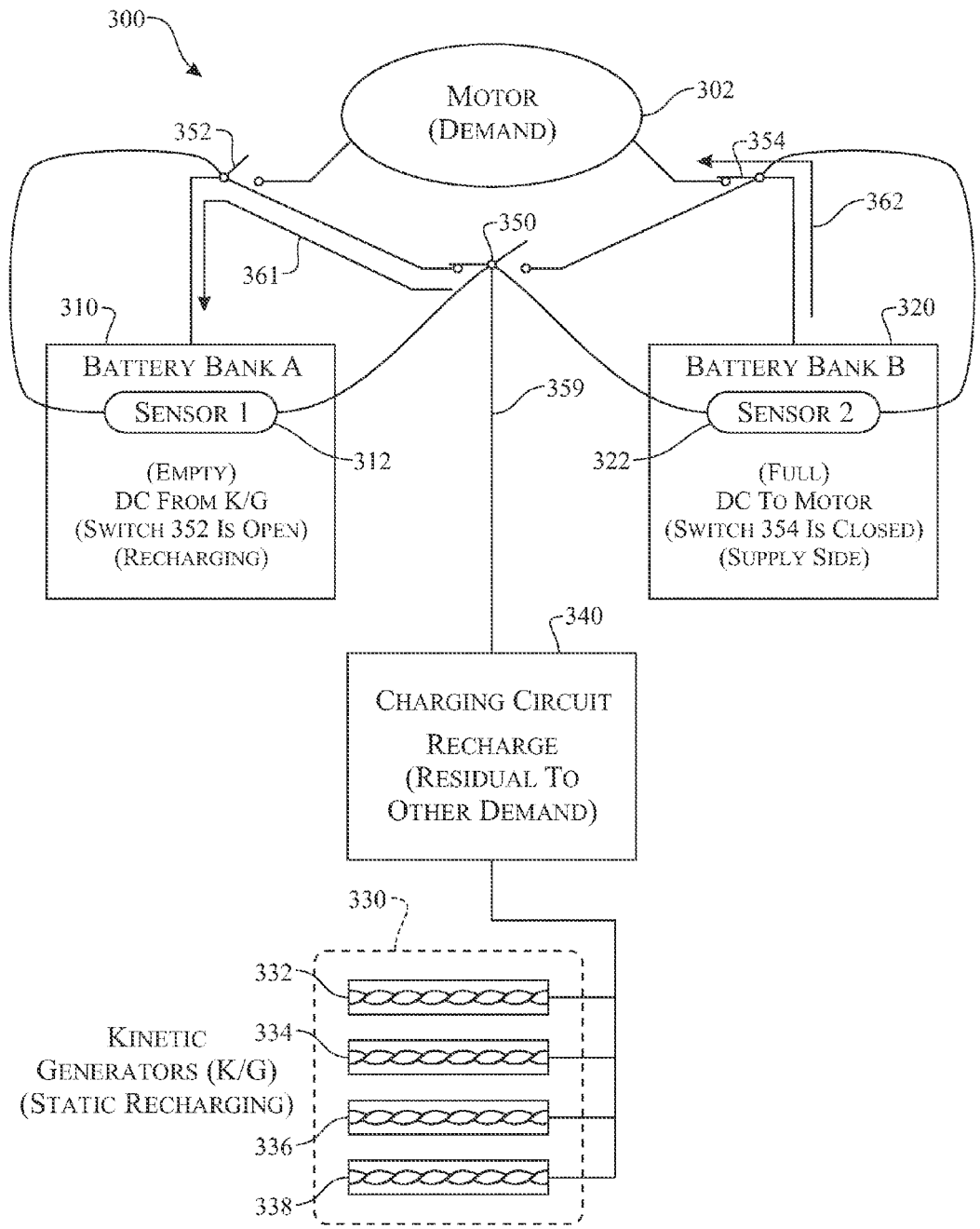
FIG. 5 presents an exemplary schematic block diagram representative of a multiple battery bank charging circuit employing at least one kinetic energy converter.

In one exemplary application, the kinetic energy converter 120 can be employed to recharge battery banks 310, 320, as presented in the exemplary dual battery bank charging circuit 300 illustrated in FIG. 5. In the exemplary embodiment, power is provided to a motor (electrical demand) 302 by either of a pair of battery banks 310, 320. A main power switch 350 is operated by conditions determined by status sensors 312, 322. In one consideration, the status sensors 312, 322 determine which battery bank 310, 320 has an electrical power capacity to drive the motor (electrical demand) 302 and which battery bank 310, 320 should be placed into a charging configuration. The sensor 312, 322 could sense voltage, stored power capacity, temperature, and the like to determine which battery bank 310, 320 should be utilized for providing power to the motor (electrical demand) 302 and which battery bank 310, 320 should be configured for recharging. The sensors 312, 322 can additionally determine if the battery bank 310, 320 is damaged and should be replaced. The status sensors 312, 322 collectively govern the configuration of each of the circuit controlling switches 350, 352, 354. The system simultaneously configures the series of switches providing the circuit switch 352, 354 associated with the battery bank 310, 320 which is connected to the closed circuit of the main power switch 350, is placed into an open configuration. Continuing, the other circuit switch 352, 354 being associated with the battery bank 310, 320 which is connected to the open circuit of the main power switch 350, is placed into an closed configuration. The process continuously considers the conditions of each of the battery banks 310, 320, and respectively configures each of the circuit controlling switches 350, 352, 354 accordingly.

The dual battery bank charging circuit 300 employs at least one kinetic generator 332 or a group of kinetic generator group 330, such as the exemplary series comprising a first kinetic generator 332, a second kinetic generator 334, a third kinetic generator 336, and a nth kinetic generator 338. The kinetic generator group 330 generates an electric power that is transferred to a battery bank 310, 320 by way of an electrical power cabling 359. A charging circuit regulator 340 can be integrated into the circuit, wherein the charging circuit regulator 340 would provide voltage regulation, current direction, overload controls, circuit management, and the like.

In the exemplary embodiment, the battery bank A 310 is determined (such as by the battery bank A sensor 312) to need recharging and the battery bank B 320 is determined (such as by the battery bank B sensor 322) to be sufficient for providing power to the motor (electrical demand) 302. This condition configures a main power switch 350 into an associated state, wherein the main power switch 350 is placed into a closed circuit configuration between the kinetic generator group 330 and the battery bank A 310, transferring power from the kinetic generator group 330 to the battery bank A 310 in accordance with a battery bank charging path 361 and the main power switch 350 is placed into an open circuit configuration between the kinetic generator group 330 and the battery bank B 320, isolating electrical communication between the kinetic generator group 330 and the battery bank B 320. In turn, a battery bank A circuit switch 352, integrated between the battery bank A 310 and the motor (electrical demand) 302 is placed into an open circuit configuration, isolating electrical communication between the battery bank A 310 and the motor (electrical demand) 302, and a battery bank B circuit switch 354, integrated between the battery bank B 320 and the motor (electrical demand) 302 is placed into a closed circuit configuration, transferring power from the battery bank B 320 to the motor (electrical demand) 302 in accordance with a motor (electrical demand) power supply path 362.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of capturing kinetic energy from a crankshaft comprising an offset crankpin and translating the kinetic energy for use in a secondary application, the method comprising steps of:
connecting a helically twisted blade to said crankpin by a connecting element;
retaining said helically twisted blade to an oscillating motion along a linear axis;
driving said helically twisted blade in an oscillating motion along a linear axis by operationally connecting said helically twisted blade to said crankpin;
integrating a clutch mechanism with an output element, wherein said output element rotates about a central axis concentric with a central axis of said helically twisted blade;
engaging said helically twisted blade with said clutch mechanism; and
driving a rotation of said output element about said central output element axis by translating said helically twisted blade oscillating motion into a unidirectional rotational motion through said clutch mechanism.

2. A method as recited in claim 1, the method further comprising step of:
driving an electrical power generating device by adapting a rotating shaft of said electrical power generating to said output element; and
generating an electrical power from said electrical power generating device.

3. A method as recited in claim 2, the method further comprising a step of:
supplying electrical power generated by said electrical power generating device to at least one battery.

4. A method as recited in claim 2, the method further comprising steps of:
supplying electrical power generated by said electrical power generating device to a portable power circuit, said portable power circuit comprising:
a first battery bank;
a second battery bank;
a main power switch selectively connecting said electrical power output to one of said first battery bank and said second battery bank;
a first battery bank circuit switch selectively connecting said first battery bank to an electrical demand element;
a second battery bank circuit switch selectively connecting said second battery bank to said electrical demand element;
determining whether said first battery bank or said second battery bank has a lower stored electrical energy;
configuring said main power switch to direct power from said electrical power generating device to said battery bank determined to have said lower stored electrical energy;
configuring said battery bank circuit switch associated with said battery bank determined to have said lower stored electrical energy into an open state;
charging said battery bank determined to have said lower stored electrical energy;
configuring said battery bank circuit switch associated with said battery bank determined to have said higher stored electrical energy into a closed state; and
providing power from said battery bank circuit switch associated with said battery bank determined to have said higher stored electrical energy to said electrical demand element.

5. A method as recited in claim 4, the method further comprising a step of:
managing electrical power transfer from said electrical power generating device to said battery bank determined to have said lower stored electrical energy by a charging management circuit integrated between said electrical power generating device and said main power switch.

6. A method as recited in claim 1, wherein said connecting element includes a piston slideably assembled within a cylinder chamber, said piston operationally coupled to said crankpin by a connecting rod, and
wherein said helically twisted blade is connected to said piston.

7. A method as recited in claim 1, wherein said output element is a shaft, the method further comprising steps of:
in a condition where said shaft is driven at a rotational rate slower than said rotational rate of a clutch assembly comprising said clutch mechanism as driven by said helically twisted blade, said clutch mechanism engages said helically twisted blade and said shaft, thus transferring a torque from said helically twisted blade to said shaft; and
in a condition where said shaft is driven at a rotational rate faster than said rotational rate of a clutch assembly comprising said clutch mechanism as driven by said helically twisted blade, said clutch mechanism disengages said helically twisted blade from said shaft, thus free spinning said helically twisted blade respective to said shaft.

8. A method of converting kinetic energy to electrical energy, the method comprising steps of:
adapting a kinetic energy converter into a system having a mechanical input and an electrical output, said kinetic energy converter comprising:
an outer cylindrical body,
an inner cylindrical body, said outer body and said inner body defining a common central axis wherein said outer body is slidably movable along said central axis with respect to said inner cylindrical body wherein said outer cylindrical body and said inner cylindrical body remain in rotational alignment,
a stator winding of a plurality of turns of at least one electrically conductive wire disposed about an inner periphery of said inner body,
a rotor having a central shaft and a plurality of magnets radially extending therefrom, said rotor rotatably disposed within said inner body and rotatable about said central axis, and
a helically twisted blade extending from said outer body to said rotor and interengaged therewith wherein axial translation of said blade rotates said rotor about said central axis;
driving said helically twisted blade in an oscillating motion along a linear central axis of said helically twisted blade;
said helically twisted blade driving a rotational difference between said of said plurality of magnets and said stator winding causing generation of an electrical power output.

9. A method as recited in claim 8, the method further comprising a step of:
supplying electrical power generated by said electrical power generating device to at least one battery.

10. A method as recited in claim 9, the method further comprising steps of:

supplying electrical power generated by said electrical power generating device to a portable power circuit, said portable power circuit comprising:
a first battery bank;
a second battery bank;
a main power switch selectively connecting said electrical power output to one of said first battery bank and said second battery bank;
a first battery bank circuit switch selectively connecting said first battery bank to an electrical demand element;
a second battery bank circuit switch selectively connecting said second battery bank to said electrical demand element;
determining whether said first battery bank or said second battery bank has a lower stored electrical energy;
configuring said main power switch to direct power from said electrical power generating device to said battery bank determined to have said lower stored electrical energy;
configuring said battery bank circuit switch associated with said battery bank determined to have said lower stored electrical energy into an open state;
charging said battery bank determined to have said lower stored electrical energy;
configuring said battery bank circuit switch associated with said battery bank determined to have said higher stored electrical energy into a closed state; and
providing power from said battery bank circuit switch associated with said battery bank determined to have said higher stored electrical energy to said electrical demand element.

11. A method as recited in claim 8, the method further comprising a step of:
driving said oscillating linear motion of said helically twisted blade by rotating a crankshaft.

12. A method as recited in claim 8, the method further comprising a step of:
operationally linking a piston to a crankshaft by a connecting rod, wherein said connecting rod is operationally connected to a crankpin of said connecting rod;
affixing said helically twisted blade to said piston;
rotating said crankshaft, causing said piston to linearly move within a cylinder; and
driving said oscillating linear motion of said helically twisted blade by said linear motion of said piston.

13. A method as recited in claim 8, the method further comprising a step of:
sliding each of said magnets along at least one pin of said series of pins.

14. A method as recited in claim 13, the method further comprising a step of:
applying a radially tensile biasing force to each magnet, wherein said radially tensile biasing force is overcome by a centrifugal force while said magnets are subjected to said radial motion.

15. A method of capturing kinetic energy from a crankshaft comprising an offset crankpin and translating the kinetic energy for use in a secondary application, the method comprising steps of:
connecting a helically twisted blade to said crankpin by a connecting element;
retaining said helically twisted blade to an oscillating motion along a linear axis;
driving said helically twisted blade in an oscillating motion along a linear axis by operationally connecting said helically twisted blade to said crankpin;
integrating a clutch mechanism with a collection of magnets provided in a generally cylindrical shape, wherein said collection of magnets rotates about a central axis concentric with a central axis of said helically twisted blade;
integrating a stator winding about said collection of magnets;
engaging said helically twisted blade with said clutch mechanism; and
driving a rotation of said collection of magnets about said helically twisted blade central axis by translating said helically twisted blade oscillating motion into a unidirectional rotational motion through said clutch mechanism; and
passing said rotating collection of magnets against said stator winding to generate an electrical power output.

16. A method as recited in claim 15, the method further comprising a step of:
supplying electrical power generated by said electrical power generating device to at least one battery.

17. A method as recited in claim 15, the method further comprising steps of:
supplying electrical power generated by said electrical power generating device to a portable power circuit, said portable power circuit comprising:
a first battery bank;
a second battery bank;
a main power switch selectively connecting said electrical power output to one of said first battery bank and said second battery bank;
a first battery bank circuit switch selectively connecting said first battery bank to an electrical demand element;
a second battery bank circuit switch selectively connecting said second battery bank to said electrical demand element;
determining whether said first battery bank or said second battery bank has a lower stored electrical energy;
configuring said main power switch to direct power from said electrical power generating device to said battery bank determined to have said lower stored electrical energy;
configuring said battery bank circuit switch associated with said battery bank determined to have said lower stored electrical energy into an open state;
charging said battery bank determined to have said lower stored electrical energy;
configuring said battery bank circuit switch associated with said battery bank determined to have said higher stored electrical energy into a closed state; and
providing power from said battery bank circuit switch associated with said battery bank determined to have said higher stored electrical energy to said electrical demand element.

18. A method as recited in claim 17, the method further comprising a step of:
managing electrical power transfer from said electrical power generating device to said battery bank determined to have said lower stored electrical energy by a charging management circuit integrated between said electrical power generating device and said main power switch.

19. A method as recited in claim 15, wherein said connecting element includes a piston slideably assembled within a cylinder chamber, said piston operationally coupled to said crankpin by a connecting rod, and
wherein said helically twisted blade is connected to said piston.

20. A method as recited in claim 15, wherein said output element is a shaft, the method further comprising steps of:
- in a condition where said shaft is driven at a rotational rate slower than said rotational rate of a clutch assembly comprising said clutch mechanism as driven by said helically twisted blade, said clutch mechanism engages said helically twisted blade and said shaft, thus transferring a torque from said helically twisted blade to said shaft; and
- in a condition where said shaft is driven at a rotational rate faster than said rotational rate of a clutch assembly comprising said clutch mechanism as driven by said helically twisted blade, said clutch mechanism disengages said helically twisted blade from said shaft, thus free spinning said helically twisted blade respective to said shaft.

* * * * *